US012744014B2

(12) United States Patent
Yang et al.

(10) Patent No.: US 12,744,014 B2
(45) Date of Patent: Sep. 22, 2026

(54) SELECTING FRAMES DURING AUGMENTED REALITY RECONSTRUCTION

(71) Applicant: International Business Machines Corporation, Armonk, NY (US)

(72) Inventors: Xiang Yu Yang, Xi'an (CN); Yong Wang, Xi'an (CN); Jun Guo, Xi'an (CN); Zhi Yong Jia, Xian (CN); Yu Pan, Shanghai (CN); Zhong Fang Yuan, Xi'an (CN)

(73) Assignee: International Business Machines Corporation, Armonk, NY (US)

(*) Notice: Subject to any disclaimer, the term of this patent is extended or adjusted under 35 U.S.C. 154(b) by 133 days.

(21) Appl. No.: 18/150,334

(22) Filed: Jan. 5, 2023

(65) Prior Publication Data

US 2024/0233665 A1 Jul. 11, 2024

(51) Int. Cl.
*G09G 3/36* (2006.01)

(52) U.S. Cl.
CPC ....... *G09G 3/3607* (2013.01); *G09G 2340/16* (2013.01)

(58) Field of Classification Search
CPC ............. G09G 2360/16; G09G 3/3233; G09G 2310/08; G09G 2320/0233
See application file for complete search history.

(56) References Cited

U.S. PATENT DOCUMENTS 8,913,503 B2 12/2014 Chen
9,076,059 B2 7/2015 Leung
12,531,016 B2* 1/2026 Lin ...................... G09G 3/3208
2013/0148851 A1* 6/2013 Leung ...................... G06T 7/74 382/103
2013/0235157 A1* 9/2013 Chen ...................... H04N 13/161 348/43
2017/0347120 A1 11/2017 Chou
2019/0088187 A1* 3/2019 Yan ...................... G09G 3/2074

(Continued)

FOREIGN PATENT DOCUMENTS

CN 103996220 A 8/2014
KR 20110064161 A 6/2011

OTHER PUBLICATIONS

JP 2024091108 Welding Monitoring System, Welding Monitoring Method and Welding Monitoring Program Jul. 4, 2024 Yamabuki Manabu (Year: 2024).*

(Continued)

*Primary Examiner* — Van N Chow
(74) *Attorney, Agent, or Firm* — Anthony Curro

(57) ABSTRACT

Performing a three-dimensional (3D) reconstruction process of a set of selected image frames. In some instances, a plurality of sequential image frames that are extracted from a video file (including video content created through the use of Augmented Reality) are converted into a grayscale format. Once these image files are converted to a grayscale format, a two-dimensional (2D) entropy process is performed that is ultimately used to create a set of user-defined clusters, with each of these user-defined clusters being associated with at least a sub-set set of the grayscale frames. After a cluster is selected, a 3D reconstruction process is performed on the frames associated with the selected cluster.

18 Claims, 4 Drawing Sheets

(56) References Cited

U.S. PATENT DOCUMENTS

| | | | | |
|---|---|---|---|---|
| 2024/0078969 | A1* | 3/2024 | Lin | G09G 3/2007 |
| 2026/0004706 | A1* | 1/2026 | Zhang | G09G 3/32 |

OTHER PUBLICATIONS

Dasgupta, Saumitro, "Indoor Augmented Reality using 3D Scene Reconstruction", Stanford University, Stanford, CA, printed on Oct. 10, 2022, 5 pages.

Doulamis, Anastasios, "Automatic 3D Reconstruction From Unstructured Videos Combining Video Summarization and Structure From Motion", Frontiers in ICT | www.frontiersin.org, Nov. 2018 | vol. 5 | Article 29, 13 pages.

Koschel et al., "Selection of Key Frames for 3D Reconstruction in Real Time", Algorithms 2021, 14, 303, MDPI, 16 pages.

Pavoni et al., "Automatic selection of video frames for path regularization and 3D reconstruction", EUROGRAPHICS Workshop on Graphics and Cultural Heritage (2016) C. E. Catalano and L. De Luca (Editors), 10 pages.

Wang et al., Video Key Frame Monitoring Algorithm and Virtual Reality Display Based on Motion Vector, Special Section on Gigapixel Panoramic Video With Virtual Reality, IEEE Access, date of current version Sep. 11, 2020, 12 pages.

Xie et al., "Hierarchical Clustering-Aligning Framework Based Fast Large-Scale 3D Reconstruction Using Aerial Imagery", remote sensing MDPI, Published: Feb. 5, 2019, 20 pages.

* cited by examiner

SELECTING FRAMES DURING AUGMENTED REALITY RECONSTRUCTION

BACKGROUND

The present invention relates generally to the field of augmented reality, and more specifically to image reconstruction techniques that utilize augmented reality.

The Wikipedia Entry for "Augmented reality" (as of Nov. 6, 2022) states as follows: "Augmented reality (AR) is an interactive experience that combines the real world and computer-generated content. The content can span multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one."

SUMMARY

According to an aspect of the present invention, there is a method, computer program product and/or system that performs the following operations (not necessarily in the following order): (i) receiving a plurality of image frames, with each given image frame of the plurality of image frames including an image, and with each given image frame of the plurality of image frames being organized in a chronological sequence; (ii) converting each given image of the plurality of images from its original image format into a grayscale image format to obtain a grayscale image frame sequence having a plurality of grayscale images; (iii) for each given grayscale image of the grayscale image frame sequence, calculating a two-dimensional image entropy in order to obtain a set of image entropy data; (iv) clustering the set of image entropy data in order to obtain a plurality of clusters, with a number of clusters in the plurality of clusters being defined by a user; (v) selecting grayscale image frames that are associated with a first cluster of the plurality of clusters; and (vi) performing a three-dimensional image reconstruction of the selected grayscale frames that are associated with the first cluster.

According to an aspect of the present invention, there is a method, computer program product and/or system that performs the following operations (not necessarily in the following order): (i) for each given grayscale image of the grayscale image frame sequence, calculating a one-dimensional entropy in order to obtain a set of image entropy values; and (ii) selecting the grayscale image that corresponds to a largest image entropy value.

In some instances, this method is advantageous because it allows for the optimal selection of a set of image frames that have been selected from a cluster of frames based upon a set of calculated two-dimensional image entropy values. This provides a user with a strong degree of confidence that the image frames that are used to perform the three-dimensional image reconstruction includes the highest quality image frames.

DETAILED DESCRIPTION

Figure 1:
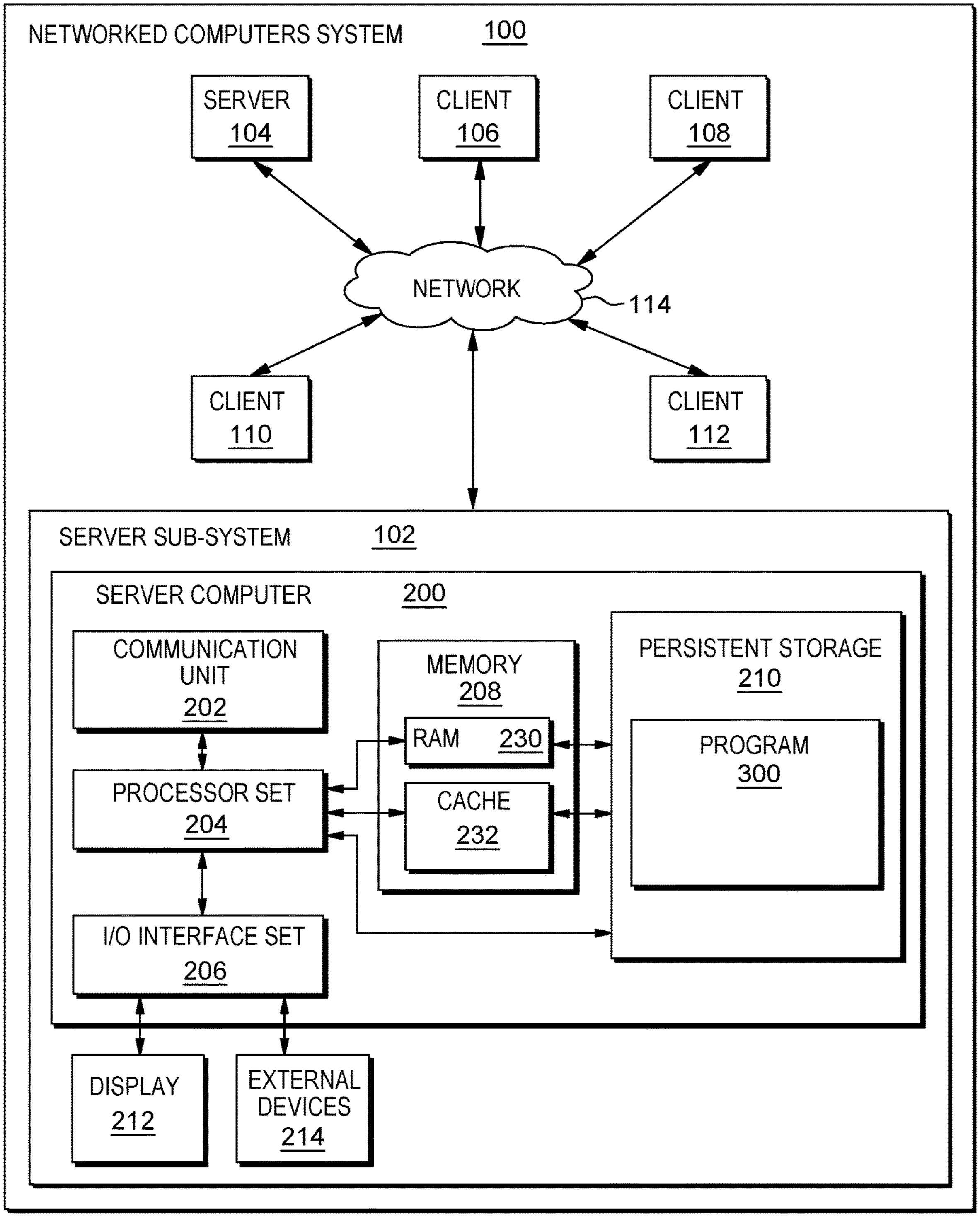
FIG. 1 is a block diagram view of a first embodiment of a system according to the present invention.

Some embodiments of the present invention are directed to performing a three-dimensional (3D) reconstruction process of a set of selected image frames. In some instances, a plurality of sequential image frames that are extracted from a video file (including video content created through the use of Augmented Reality) are converted into a grayscale format. Once these image files are converted to a grayscale format, a two-dimensional (2D) entropy process is performed that is ultimately used to create a set of user-defined clusters, with each of these user-defined clusters being associated with at least a sub-set set of the grayscale frames. After a cluster is selected, a 3D reconstruction process is performed on the frames associated with the selected cluster.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
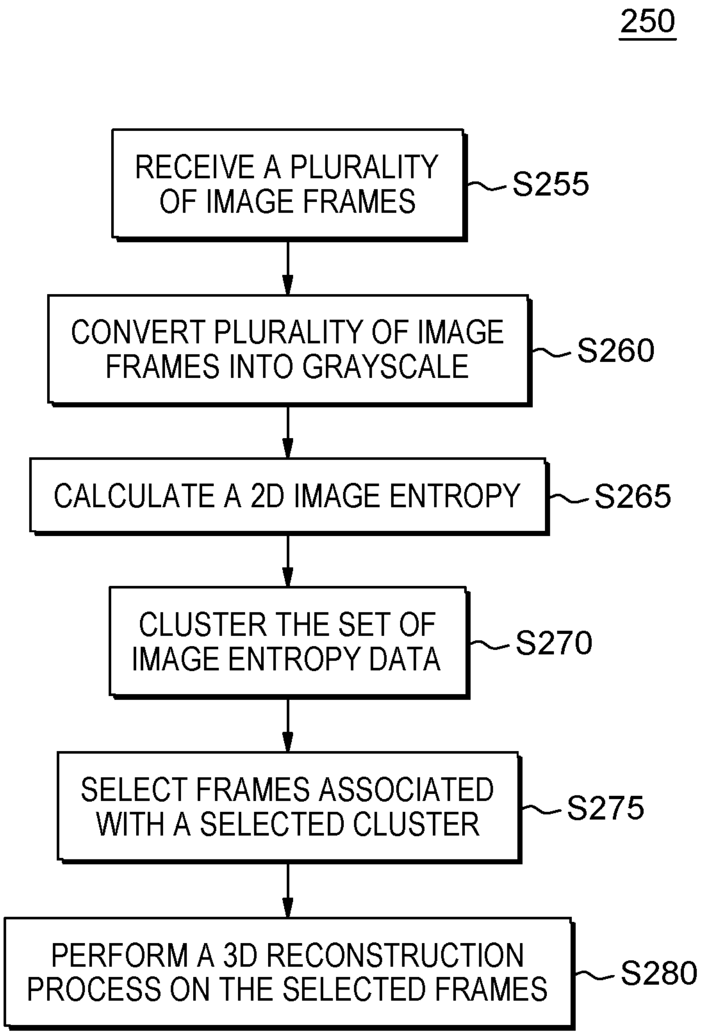
FIG. 2 is a flowchart showing a first embodiment method performed, at least in part, by the first embodiment system.
Figure 3:
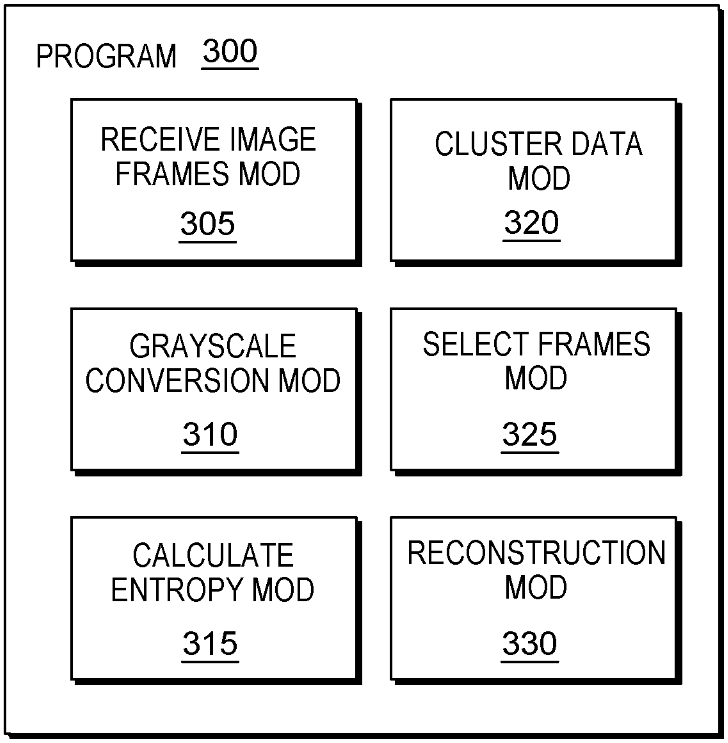
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where receive image frames module ("mod") 305 receives a plurality of image frames. In some embodiments of the present invention, the image frames that are received by receive image frames mod 305 are organized in a chronological sequence. In some embodiments, the image frames that are received are at least a portion of a video file (and can sometimes be the entire video file).

Processing proceeds to operation S260, where grayscale conversion mod 310 converts the plurality of image frames (discussed in connection with operation S255, above) into a grayscale format. This allows the plurality of image frames to be converted into a grayscale image frame sequence. In one embodiment, converting a set of image frames to a grayscale format is shown in flow diagram 400 of FIG. 4 with respect to gray frame sequence 404 (discussed in greater detail in Sub-Section III, below).

Processing proceeds to operation S265, where calculate entropy mod 315 calculates a two-dimensional entropy in order to obtain a set of image entropy data. In some embodiments of the present invention, calculate entropy mod 315 calculates the two-dimensional entropy according to equations (2) and (3) (as referenced in connection with Sub-Section III, below).

Processing proceeds to operation S270, where cluster data mod 320 clusters the set of image entropy data (discussed in connection with operation S265, above). In some embodiments, cluster data mod 320 produces a multitude of clusters using the calculated two-dimensional entropy values; however, this number of clusters is defined by the user. In some embodiments, various frames from the grayscale image frame sequence (discussed in connection with operation S260, above) are associated with a given cluster.

Processing proceeds to operation S275, where select frames mod 325 selects a set of frames that are associated with a selected cluster from the multitude of clusters (discussed in connection with operation S270, above). In some embodiments of the present invention, the cluster that is ultimately selected is based upon several factors, including the category of image frames having a desired image frame length and/or a set of characteristics that are desired for the image reconstruction process.

Processing finally proceeds to operation S280, where reconstruction mod 330 performs a three-dimensional (3D) reconstruction process of the selected frames (discussed in connection with operation S275, above). In some embodiments, the reconstructed frames are represented as a final frame sequence (such as final frame sequence 412, as shown in flow diagram 400 of FIG. 4).

III. Further Comments and/or Embodiments

Augmented Reality is a very popular and useful technology in the development of society, especially with respect to various industries including the automobile and manufacturing industries. These are the important fields that always applying virtual reality (VR) and AR related artificial intelligence (AI) technologies. For example, AR can be applied in self-guidance scenarios, where AR SME creates the AR process according to different steps of videos. In some instances, three-dimensional (3D) reconstruction process is triggered by corresponding videos and SME marks (such as annotations and/or flags) on the 3D model and gives hint messages or guidance message for it. Once this process is done, a mobile side user, like a factory inspector, can use the AR process directly for the real cases.

However, for the problem that embodiments of the present invention are designed to solve, this is about the most important aspect of the 3D reconstruction process. During this process, an uploaded video is split into a multitude of frames (individual images). These individual images are related and are used in the computation process. Generally, this computation process costs too much time and resources because of its complexity. Besides, due to the time and resource cost, bad user experience typically occurs. In order to solve this problem, embodiments of the present invention provide a system and method to choose those frames dynamically and intelligently.

Embodiments of the present invention provides a new sampling method for the video data sampling process in AR 3D reconstruction. This method calculates the similarity between video frames based on the two-dimensional (2D) image entropy information as the basic feature of the image, which removes highly similar images and retains different frames, then improves the acquisition process of the 3D reconstructed image data and prevents losing important information from the rough video frame extraction method.

Embodiments of the present invention utilize a five (5) step process to implement the method. The operations of this method include: (i) collect video data of each angle of the target object through the video acquisition equipment; (ii) extract video frames and grayscale them; (iii) calculate the two-dimensional image entropy of each frame; (iv) through the clustering algorithm, the image entropy data of frames are clustered with the number of user-defined frames as the number of clusters; and (v) calculate the one-dimensional image entropy and select the frame with the largest image entropy in the class as the output frame in this class to ensure the image quality of the output frame.

Some embodiments of the present invention include the following features, characteristics, and/or advantages: (i) a cognitive video sampling method in the process of 3D reconstruction; (ii) uses the two-dimensional image entropy information as the feature of image frames to calculate the similarity between frames; (iii) uses the combination of image entropy information and clustering method to extract high-quality frames; and (iv) automatically and intelligently select the video frames for 3D reconstruction process.

Some embodiments of the present invention includes a method for performing a 3D reconstruction process for a given set of image frames in an intelligent and dynamic manner. The operations for this method include the following (not necessarily in the following order): (i) receiving an image frame sequence (for example, a video); (ii) converting each image frame of the image frame sequence to grayscale to obtain a grayscale image frame sequence; (iii) calculating, for each grayscale image of the grayscale image frame sequence, a 2-dimensional (2D) image entropy to receive image entropy data of each grayscale image; (iv) performing clustering on the image entropy data associated with each grayscale image, wherein a number of clusters generated by the clustering are defined by a user; (v) selecting frames associated with a first cluster of the number of clusters; and (vi) performing a 3-dimensional (3D) reconstruction process using the selected frames.

Typically, for general video splits and the frame selection process, there is a reconstruction process that requires set of images. Consequently, videos that use this method need to be sampled into single images. This sampling can be done in two ways: (1) constant skips (frame 1, 5, 10, 15, . . . ); or (2) automatic/random frame selection.

For our intelligent Video Split and Frames Choosing process, embodiments of the present invention intelligently compute the relevance of the images within the sliding window. Then, the images/frames are selected in a minimum set. Image entropy information is a statistical form of features, which reflects the average amount of information in the image. That is, the entropy of an image can be described as a statistical measure that can be used to characterize the texture (the substantive content that is defined by the cluster of pixels contained within an image) of an input image. The difference between image entropy corresponds to the substantial difference between image content.

In some embodiments, one-dimensional image entropy represents the aggregation feature of image gray distribution (that is, the probability of gray value of pixels). Additionally, one-dimensional entropy is represented by Equation (1):

$$H=\sum_{i=0}^{255} p_i \log p_i$$

In some embodiments, two-dimensional image entropy is used. Based on one-dimensional image entropy, the feature quantity that can reflect the spatial characteristics of gray distribution is added in two-dimensional image entropy. It reflects the comprehensive characteristics of the gray value at a pixel position and the gray distribution of pixels in its vicinity.

Typically, one-dimensional image entropy cannot fully reflect the spatial characteristics of image gray distribution. For similar objects, the gray space also has a similarity. Only through the gray space, the frames of the same object from different spatial positions will be regarded as a same image, and this is not correct. Since AR 3D reconstruction is shot from different angles of the same scene/object, and the gray space of the object has great similarity between each frame, embodiments of the present invention uses two-dimensional image entropy as the feature of the frame. This is shown in flow diagram 400 of FIG. 4.

Figure 4:
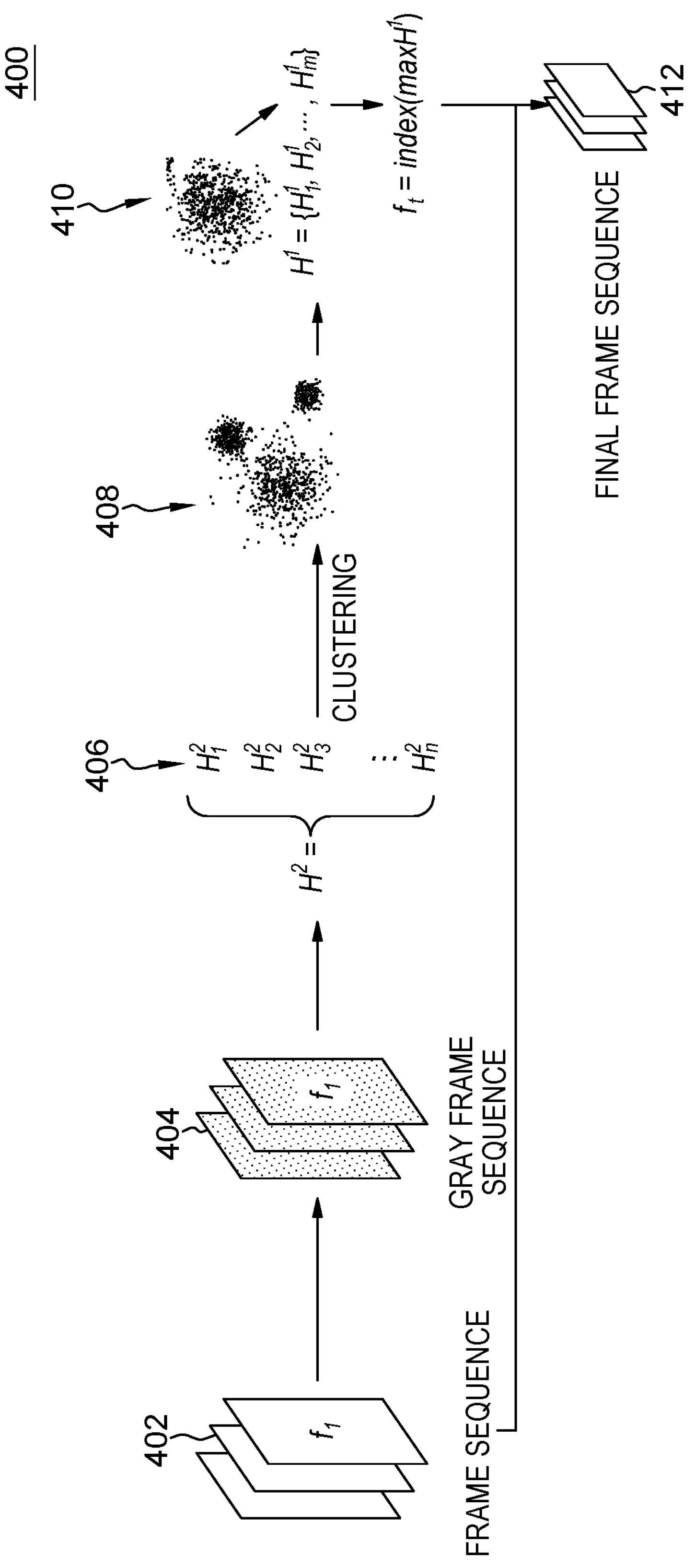
FIG. 4 is a flow diagram showing information that is helpful in understanding embodiments of the present invention.

Flow diagram 400 of FIG. 4 includes the following: frame sequence 402, gray frame sequence 404, 2D image entropy values 406, set of clusters 408, cluster 410, and final frame sequence 412.

In some embodiments, two-dimensional entropy is represented by Equation (2):

$$P_{ij} = f(ii, j) \big/ N^2$$

Additionally, in some embodiments, two-dimensional entropy is represented by Equation (3):

$$H = \sum_{i=0}^{255} P_{ij} \log P_{ij}$$

In both Equations (2) and (3), "i" represents the pixel value, "j" represents the pixel mean value that is in a certain proximity of pixel value "i," and the value range is [0,255].

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:

receiving a plurality of image frames, with each given image frame of the plurality of image frames including an image, and with each given image frame of the plurality of image frames being organized in a chronological sequence;

converting each given image of the plurality of images from its original image format into a grayscale image format to obtain a grayscale image frame sequence having a plurality of grayscale images;

for each given grayscale image of the grayscale image frame sequence, calculating a two-dimensional image entropy in order to obtain a set of image entropy data;

clustering the set of image entropy data in order to obtain a plurality of clusters, with a number of clusters in the plurality of clusters being defined by a user;

selecting grayscale image frames that are associated with a first cluster of the plurality of clusters; and performing a three-dimensional image reconstruction of the selected grayscale frames that are associated with the first cluster.

2. The CIM of claim 1 wherein the calculation of the two-dimensional image entropy is based, at least in part, upon a set of pixel density values.

3. The CIM of claim 1 wherein the calculation of the two-dimensional image entropy is based, at least in part, upon a gray value at a defined pixel position.

4. The CIM of claim 1 wherein the calculation of the two-dimensional image entropy is based, at least in part, upon a distribution of gray pixels that are proximate to a defined gray value.

5. The CIM of claim 1 wherein the plurality of image frames includes image frames that are taken from video data of multiple angles of a target object.

6. The CIM of claim 1 further comprising:

for each given grayscale image of the grayscale image frame sequence, calculating a one-dimensional entropy in order to obtain a set of image entropy values; and selecting the grayscale image that corresponds to a largest image entropy value.

7. A computer program product comprising:

a machine readable storage device; and computer code stored on the machine readable storage device, with the computer code including instructions and data for causing a processor(s) set to perform operations including the following:

receiving a plurality of image frames, with each given image frame of the plurality of image frames including an image, and with each given image frame of the plurality of image frames being organized in a chronological sequence, converting each given image of the plurality of images from its original image format into a grayscale image format to obtain a grayscale image frame sequence having a plurality of grayscale images, for each given grayscale image of the grayscale image frame sequence, calculating a two-dimensional image entropy in order to obtain a set of image entropy data, clustering the set of image entropy data in order to obtain a plurality of clusters, with a number of clusters in the plurality of clusters being defined by a user, selecting grayscale image frames that are associated with a first cluster of the plurality of clusters, and performing a three-dimensional image reconstruction of the selected grayscale frames that are associated with the first cluster.

8. The CPP of claim 7 wherein the calculation of the two-dimensional image entropy is based, at least in part, upon a set of pixel density values.

9. The CPP of claim 7 wherein the calculation of the two-dimensional image entropy is based, at least in part, upon a gray value at a defined pixel position.

10. The CPP of claim 7 wherein the calculation of the two-dimensional image entropy is based, at least in part, upon a distribution of gray pixels that are proximate to a defined gray value.

11. The CPP of claim 7 wherein the plurality of image frames includes image frames that are taken from video data of multiple angles of a target object.

12. The CPP of claim 7 further comprising:

for each given grayscale image of the grayscale image frame sequence, calculating a one-dimensional entropy in order to obtain a set of image entropy values; and selecting the grayscale image that corresponds to a largest image entropy value.

13. A computer system (CS) comprising:

a processor(s) set;

a machine readable storage device; and computer code stored on the machine readable storage device, with the computer code including instructions and data for causing the processor(s) set to perform operations including the following:

receiving a plurality of image frames, with each given image frame of the plurality of image frames including an image, and with each given image frame of the plurality of image frames being organized in a chronological sequence, converting each given image of the plurality of images from its original image format into a grayscale image format to obtain a grayscale image frame sequence having a plurality of grayscale images, for each given grayscale image of the grayscale image frame sequence, calculating a two-dimensional image entropy in order to obtain a set of image entropy data, clustering the set of image entropy data in order to obtain a plurality of clusters, with a number of clusters in the plurality of clusters being defined by a user, selecting grayscale image frames that are associated with a first cluster of the plurality of clusters, and performing a three-dimensional image reconstruction of the selected grayscale frames that are associated with the first cluster.

14. The CS of claim 13 wherein the calculation of the two-dimensional image entropy is based, at least in part, upon a set of pixel density values.

15. The CS of claim 13 wherein the calculation of the two-dimensional image entropy is based, at least in part, upon a gray value at a defined pixel position.

16. The CS of claim 13 wherein the calculation of the two-dimensional image entropy is based, at least in part, upon a distribution of gray pixels that are proximate to a defined gray value.

17. The CS of claim 13 wherein the plurality of image frames includes image frames that are taken from video data of multiple angles of a target object.

18. The CS of claim 13 further comprising:

for each given grayscale image of the grayscale image frame sequence, calculating a one-dimensional entropy in order to obtain a set of image entropy values; and selecting the grayscale image that corresponds to a largest image entropy value.

* * * * *